(12) United States Patent
Aoki et al.

(10) Patent No.: US 6,968,748 B2
(45) Date of Patent: Nov. 29, 2005

(54) ROTATION SENSOR

(75) Inventors: Yuhide Aoki, Gunma (JP); Koichi Fujiwara, Gunma (JP)

(73) Assignee: Hitachi Inisia Automotive, Ltd., Kanagawa (JP)

( * ) Notice: Subject to any disclaimer, the term of this patent is extended or adjusted under 35 U.S.C. 154(b) by 7 days.

(21) Appl. No.: 10/895,896

(22) Filed: Jul. 22, 2004

(65) Prior Publication Data

US 2005/0016297 A1    Jan. 27, 2005

(30) Foreign Application Priority Data

Jul. 25, 2003  (JP) ............................. 2003-201946

(51) Int. Cl.[7] .............................................. G01L 3/02
(52) U.S. Cl. .............................................. 73/862.325
(58) Field of Search ...................... 73/862.325, 862.333

(56) References Cited

U.S. PATENT DOCUMENTS

| | | | |
|---|---|---|---|
| 4,326,143 A | 4/1982 | Dahler et al. | |
| 4,862,316 A | 8/1989 | Smith et al. | |
| 5,083,359 A | * 1/1992 | Aminder et al. | ....... 73/862.333 |
| 5,255,567 A | * 10/1993 | Miyake et al. | ......... 73/862.333 |
| 5,589,664 A | 12/1996 | Robe | |
| 6,484,592 B2 | * 11/2002 | Sezaki | ................... 73/862.335 |

FOREIGN PATENT DOCUMENTS

| | | |
|---|---|---|
| DE | 197 44 673 A | 5/1999 |
| JP | 2000-310646 A | 11/2000 |
| WO | WO 90/09027 A | 8/1990 |

* cited by examiner

*Primary Examiner*—Max Noori
(74) *Attorney, Agent, or Firm*—Sughrue Mion, PLLC

(57) ABSTRACT

A rotation sensor includes a detecting element housed in a sensor casing. In an assembled state on a vehicle body member, the detecting element detects a rotation of a rotating object. An antistatic layer composed of an antistatic agent is formed at least at a part of the sensor casing around the detecting element. The antistatic layer is grounded by being connected to the vehicle body member in the assembled state.

8 Claims, 2 Drawing Sheets

ROTATION SENSOR

BACKGROUND OF THE INVENTION

The present invention relates to a rotation sensor for sensing a rotation of a rotating object.

Japanese Patent Application Publication No. 2000-310646 discloses an example of existing rotation sensors. In this example, the rotation sensor includes a sensor casing made of an insulating material, such as a resin material. The sensor casing includes a case member and a housing mounted on an open end of the case member. The case member houses electronic and magnetic components, such as a magnetic transducer element and a magnet. The magnetic transducer element is disposed at a position inside a closed end of the case member, and detects a rotation of an object rotating at a position outside the closed end of the case member. The housing is provided with a fixing part.

The rotation sensor of this example is fixed by the housing so that the closed end face of the case member is disposed close to the rotating object. The rotation of the object fluctuates a magnetic field existing at the position of the magnetic transducer element. The magnetic transducer element detects the fluctuation of the magnetic field, and thereby outputs information concerning the rotation of the object.

SUMMARY OF THE INVENTION

It is an object of the present invention to provide a rotation sensor capable of detecting a rotation of an object without causing a detection error resulting from an electric charge on an insulator surrounding a magnetic transducer element.

According to one aspect of the present invention, a rotation sensor includes: a detecting element to detect a rotation of an object; and an antistatic casing housing the detecting element, and including an antistatic layer formed around the detecting element and arranged to be connected to a ground.

The other objects and features of this invention will become understood from the following description with reference to the accompanying drawings.

DETAILED DESCRIPTION OF THE INVENTION

Figure 1:
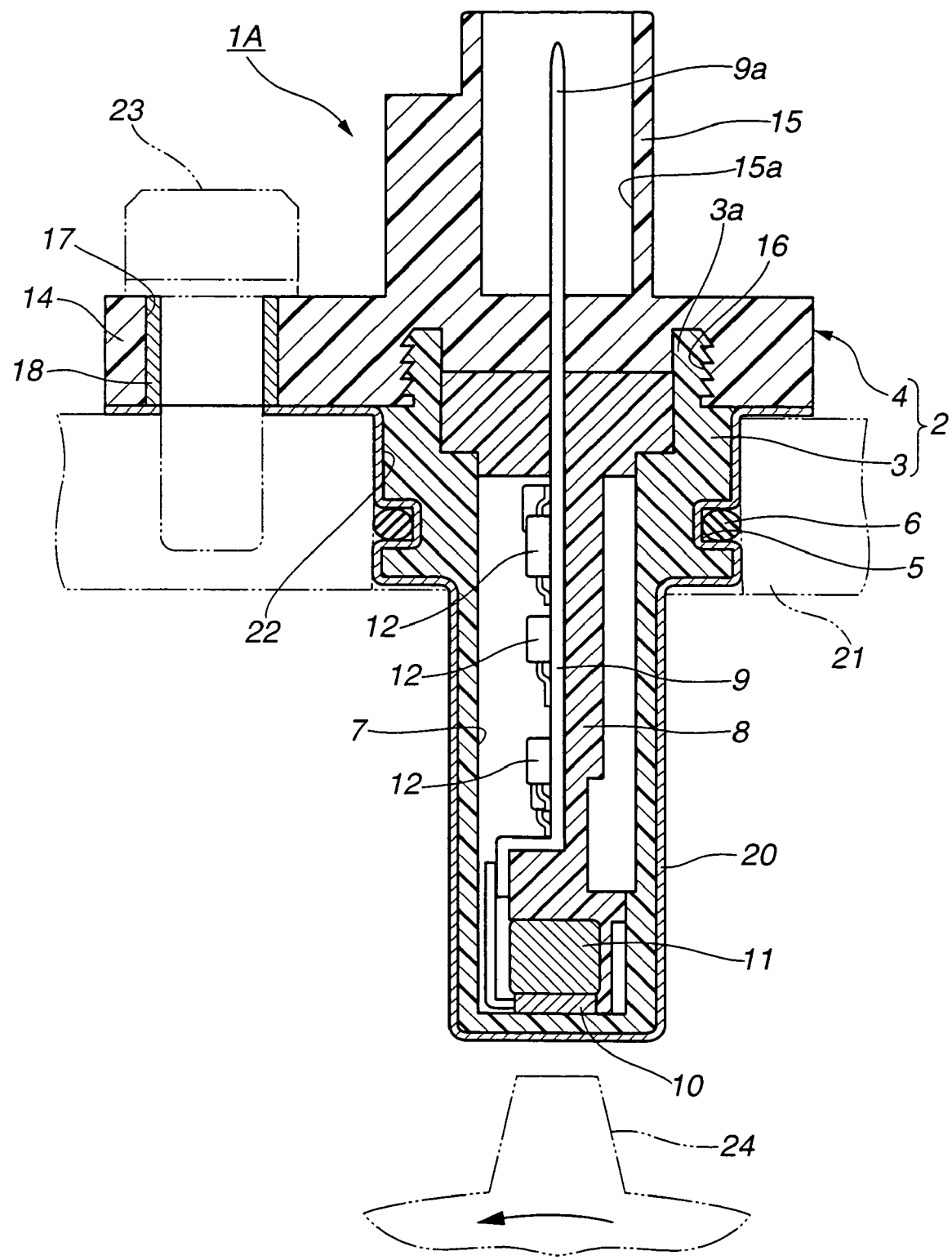
FIG. 1 is a sectional view showing a rotation sensor according to a first embodiment of the present invention.

FIG. 1 is a sectional view showing a rotation sensor 1A according to a first embodiment of the present invention. As shown in FIG. 1, the rotation sensor 1A includes a sensor casing 2 made of an insulating material, such as a resin material. The sensor casing 2 includes a case member 3 and a housing 4. The case member 3 is formed in a substantially cylindrical shape having a multi-stepped outer surface, projects downward, and is screwed into the housing 4.

The case member 3 is formed with a seal insertion groove 5 around a stepped part of the outer surface. A seal member 6 is fitted into the seal insertion groove 5. The case member 3 is formed with a component chamber 7 inside. The component chamber 7 houses a component holder 8. A terminal 9 made of conductive metallic materials is fixed to the component holder 8. The component chamber 7 includes a magnetic transducer element 10, a magnet 11, and other electronic components 12. The magnetic transducer element 10, the magnet 11, and the electronic components 12 are fixed to the component holder 8. The magnetic transducer element 10 is disposed at a position inside a closed bottom end of the case member 3. The magnetic transducer element 10 is a detecting element which detects a rotation of a rotating object. The terminal 9 is electrically connected with the magnetic transducer element 10 and the electronic components 12, and functions as an electrically conducting pathway for the magnetic transducer element 10 and the electronic components 12. An upper end of the terminal 9 projects upward from the housing 4, and forms a pin terminal 9a located in a socket portion 15 of the housing 4.

The housing 4 includes a flange portion 14 and the socket portion 15. The flange portion 14 is formed larger in diameter than the case member 3. The socket portion 15 is formed above the flange portion 14. The flange portion 14 is formed with a screw hole 16 opening at a bottom surface. The case member 3 is formed with a threaded projection 3a projecting upward from an open upper end of the case member 3. The threaded projection 3a is screwed into the screw hole 16. The flange portion 14 is formed with a portion projecting radially outward beyond the socket portion 15. The radially projecting portion is formed with an insertion hole 17 extending vertically through the radially projecting portion. The insertion hole 17 is used for mounting the rotation sensor 1A on an external member. A sleeve 18 made of a conductive metal is fixed to an inside surface of the insertion hole 17.

The socket portion 15 is formed with a pin connection chamber 15a opening upward. The pin terminal 9a projects upward in the pin connection chamber 15a. The socket portion 15 is connectable with an external connector. The rotation sensor 1A is supplied with electric power via the external connector, and outputs a detection signal via the external connector.

The sensor casing 2 includes an antistatic layer 20 formed throughout the outer circumference and the bottom surface of the case member 3 and on the bottom surface of the housing 4. In this example, the antistatic layer 20 is formed by applying an antistatic agent containing a nonmagnetic conductive substance. In this embodiment, the sensor casing 2 with the antistatic layer 20 corresponds to an antistatic casing.

In an assembled state in a vehicle, the rotation sensor 1A is fixedly mounted on a vehicle body member 21 inside an engine room of the vehicle. In this example, the vehicle body member 21 is formed with a sensor mounting hole 22 extending vertically through the vehicle body member 21, and the case member 3 of the rotation sensor 1A is inserted into the sensor mounting hole 22 from upward until the bottom surface of the housing 4 abuts against an upper surface of the vehicle body member 21. Then, a mounting screw 23 is inserted through the insertion hole 17 of the housing 4 from upward, and is further screwed into the vehicle body member 21. The bottom end face of the case member 3 is disposed close to a gear member 24, which is the object of the detection. The antistatic layer 20 is grounded by being connected to the vehicle body member 21 directly or via the sleeve 18 and the mounting screw 23.

When the gear member 24 rotates in this state, the rotation of the gear member 24 fluctuates a magnetic field existing at the position of the magnetic transducer element 10. The magnetic transducer element 10 detects the fluctuation of the magnetic field, and thereby outputs information concerning the rotation of the gear member 24.

If the sensor casing, which is an insulator made of an insulating material, becomes electrically charged, the electric charge may cause effects such as an arc. Due to these effects, the magnetic transducer element may output an abnormal signal, and thus may cause a detection error. Especially when the rotation sensor is disposed in an intense electric field such as in the engine room, the sensor casing is prone to be electrically charged, and therefore the magnetic transducer element is likely to cause a detection error resulting from the electric charge.

According to the present embodiment, by contrast, the antistatic layer 20 is formed on the outer surface of the sensor casing 2 and grounded via the above-described ground connection. Therefore, when the rotation sensor 1A is disposed in such intense electric field of the engine room, the electric charge on the antistatic layer 20 is immediately discharged via the ground connection so as to prevent the sensor casing 2 from being electrically charged. Thus, the rotation sensor 1A can prevent the magnetic transducer element 10 from causing a detection error resulting from an electric charge on the insulator (or the sensor casing 2) surrounding the magnetic transducer element 10.

In the first embodiment, the antistatic layer 20 can be formed on the outer surface of the sensor casing 2 easily by applying the above-mentioned antistatic agent on the surface of the sensor casing 2. Similarly, the antistatic layer 20 can be easily formed on an existing sensor casing.

As mentioned above, in the first embodiment, the antistatic agent forming the antistatic layer 20 contains a nonmagnetic conductive substance. Therefore, the antistatic layer 20 does not affect the magnetic field, and thus the magnetic transducer element 10 can maintain a precision of the detection.

Figure 2:
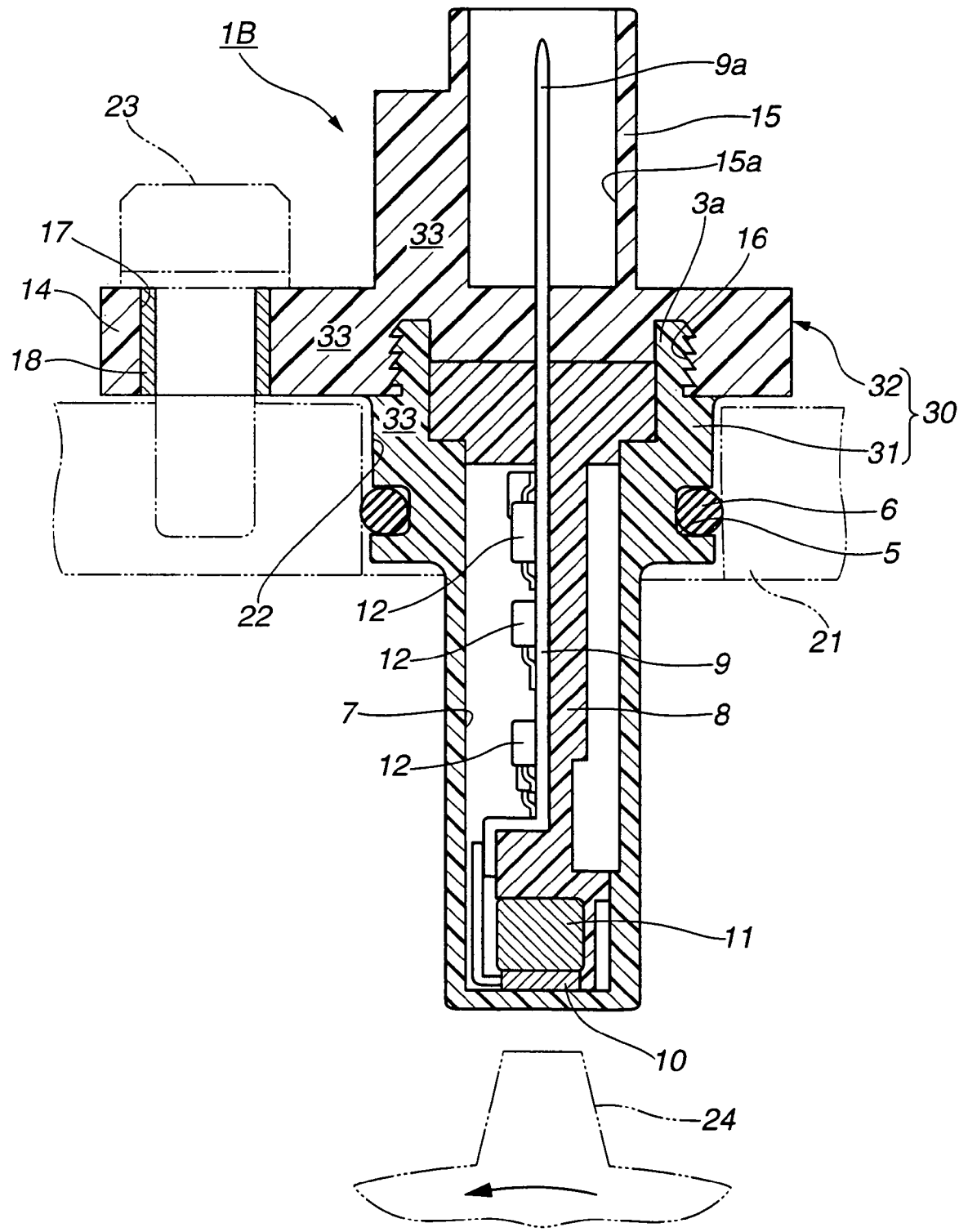
FIG. 2 is a sectional view showing a rotation sensor according to a second embodiment of the present invention.

FIG. 2 is a sectional view showing a rotation sensor 1B according to a second embodiment of the present invention. As shown in FIG. 2, the rotation sensor 1B includes a sensor casing 30 instead of the sensor casing 2 of FIG. 1. The sensor casing 30 includes a case member 31 and a housing 32. Each of the case member 31 and the housing 32 is made of a material containing an antistatic agent. Thus, the case member 31 and the housing 32 together form an antistatic layer 33. In this embodiment, the sensor casing 30 itself made of the antistatic agent to form the antistatic layer 33 corresponds to an antistatic casing. Other elements of FIG. 2 are identical or equivalent to the corresponding elements of FIG. 1 which are indicated by the same reference marks, and therefore will not be described in this part of description.

In the second embodiment, the antistatic layer 33 can be formed as the case member 31 and the housing 32 of the sensor casing 30. Thus, the rotation sensor 1B can be manufactured without a step especially dedicated to form the antistatic layer 33.

Besides, the present invention is applicable to other variations as described hereinbelow. In each of the variations, the rotation sensor can achieve substantially the same functions, effects and advantages as in the foregoing first and second embodiments.

(1) In the first embodiment, instead of forming the antistatic layer 20 on the outer surface of the sensor casing 2, the antistatic layer 20 may be formed on the inner surface of the sensor casing 2. The antistatic layer 20 formed on the inner surface needs an elaborate ground connection, when compared with the antistatic layer 20 formed on the outer surface.

(2) In the first embodiment, the antistatic layer 20 is formed on parts of the sensor casing 2, i.e., on the outer surface of the case member 3 and the bottom surface of the housing 4, which surround the magnetic transducer element 10. Instead, the antistatic layer 20 may be formed all over the outer surface of the sensor casing 2. The antistatic layer 20 thus formed can surely prevent the sensor casing 2 from being electrically charged.

(3) In the first and second embodiments, although the magnetic transducer element 10 forms the detecting element, any element capable of detecting a rotation of an object may form the detecting element.

This application is based on a prior Japanese Patent Application No. 2003-201946 filed on Jul. 25, 2003. The entire contents of this Japanese Patent Application No. 2003-201946 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A rotation sensor comprising:
    a detecting element to detect a rotation of an object disposed external to the sensor; and
    an antistatic casing housing the detecting element, and including an antistatic layer formed around the detecting element and arranged to be connected to a ground.

2. A rotation sensor comprising:
    a detecting element to detect a rotation of an object; and
    an antistatic casing housing the detecting element, and including an antistatic layer formed around the detecting element and arranged to be connected to a ground,
    wherein the antistatic casing includes a sensor casing housing the detecting element, wherein the antistatic layer is made of an antistatic agent applied on a surface of the sensor casing.

3. The rotation sensor as claimed in claim 1, wherein the antistatic layer forms a sensor casing made of a material containing an antistatic agent and housing the detecting element.

4. The rotation sensor as claimed in claim 1, wherein the antistatic layer is composed of an antistatic agent containing a nonmagnetic conductive substance.

5. The rotation sensor as claimed in claim 1, wherein the detecting element is a magnetic transducer element.

6. The rotation sensor as claimed in claim 2, wherein the antistatic layer is formed on an outer surface of the sensor casing.

7. A rotation sensor comprising:
    a detecting element to detect a rotation of an object; and
    an antistatic casing housing the detecting element, and including an antistatic layer formed around the detecting element and arranged to be connected to a ground,
    wherein the antistatic casing includes a case member projecting from an open end to a bottom end, the case member housing the detecting element at the bottom end,
    wherein the antistatic layer is formed at a bottom part and an outer circumference of the case member.

8. The rotation sensor as claimed in claim 7, wherein the antistatic casing includes a housing mounted on the open end of the case member; and the antistatic layer is arranged to be connected to the ground via the housing.

* * * * *